(12) United States Patent
Müller

(10) Patent No.: US 6,571,137 B1
(45) Date of Patent: May 27, 2003

(54) SYSTEM AND METHOD FOR REDUCING JITTER IN A SIGNAL

(75) Inventor: Reiner Müller, Pinzberg (DE)

(73) Assignee: Siemens Aktiengesellschaft, Munich (DE)

( * ) Notice: Subject to any disclaimer, the term of this patent is extended or adjusted under 35 U.S.C. 154(b) by 464 days.

(21) Appl. No.: 09/594,540

(22) Filed: Jun. 14, 2000

(51) Int. Cl.$^7$ .................................................. G06F 9/48
(52) U.S. Cl. ........................ 700/71; 700/159; 709/319; 712/233
(58) Field of Search ............................. 700/71, 72, 159, 700/187, 193, 186; 709/310, 319; 710/59, 61, 260; 712/233, 234

(56) References Cited

U.S. PATENT DOCUMENTS

| | | | | |
|---|---|---|---|---|
| 4,260,912 A | * | 4/1981 | Bjorke | 307/597 |
| 4,718,074 A | * | 1/1988 | Mannas et al. | 375/118 |
| 5,941,976 A | * | 8/1999 | Gulick | 710/260 |
| 6,054,830 A | * | 4/2000 | Tsujikado et al. | 318/571 |

* cited by examiner

Primary Examiner—Paul P. Gordon
(74) Attorney, Agent, or Firm—Foley & Lardner

(57) ABSTRACT

A system for reducing jitter in a signal includes a processor and a timer. The processor is configured to operate a first program and a second program. The timer is configured to generate a first interrupt a predetermined time before a second interrupt and to provide the interrupts to the processor. The processor is further configured to switch operation from the first program to the second program in response to the first interrupt and to perform time sensitive tasks upon receipt of the second interrupt.

26 Claims, 3 Drawing Sheets

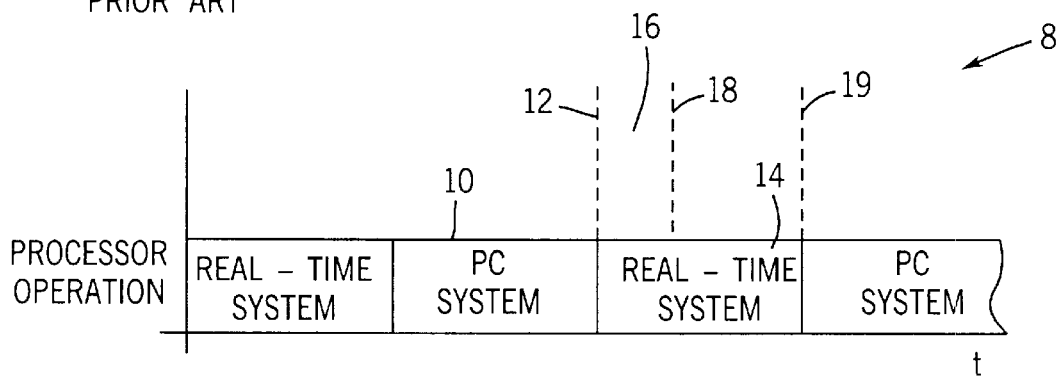
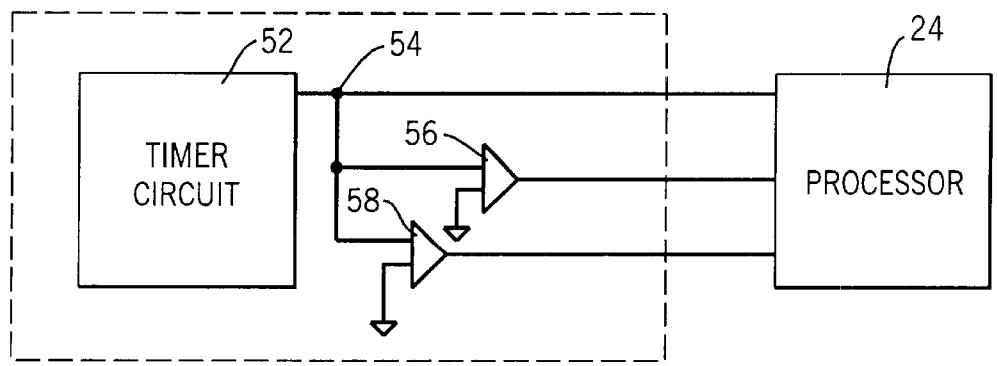

SYSTEM AND METHOD FOR REDUCING JITTER IN A SIGNAL

FIELD OF THE INVENTION

The present invention relates generally to control systems for performing operations based on a signal. More particularly, the present invention relates to real-time control systems for performing time sensitive operations based on a clock signal.

BACKGROUND OF THE INVENTION

Personal computer (PC) technology is becoming popular in systems with real-time requirements, such as control systems. One example is in control systems for drives (e.g., electrical drives, hydraulic drives, etc.). Manufacturers and users of machine tools are making increasingly exacting demands on the functionality of CNC (Computer Numeric Control) systems, demands that are mainly machine or application-specific and are not easily integrated in a standard control. Thus, it is desirable to have a control system which is open so that various applications can be implemented with the control system. PC technology provides such an open architecture.

However, PC technology does not generally have an operating system with adequate real-time capability. Hardware and software interrupts, interrupt closes, direct memory accesses (DMAs), and a myriad of other interrupts occupy the processor of the PC for long periods of time, preventing the processor from processing and sending data according to a real-time clock.

A control system running a PC operating system on one processor and a real-time operating system on another processor is costly. Accordingly, a single processor running first and second operating systems has been implemented. The first operating system is a PC operating system, such as MICROSOFT WINDOWS NT or other DOS-based system, and the second operating system is a real-time operating system. As a rule, such real-time operating systems operate according to a fixed clock signal generated by a timer circuit or a signal needed at an exact time in the future (e.g., a cam control signal). The fluctuation of this clock rate, called "jitter", is a measure of the quality of the real-time system.

The timing diagram in FIG. 1 illustrates one problem with this system. Timing diagram 8 has an x-axis representing time and a y-axis representing processor operation. During time period 10, the processor is running the PC operating system. At time 12, a clock signal is received from the timer circuit, indicating the need to run the real-time operating system, as shown at time period 14. However, an interrupt has been received by PC system 10 prior to time 12. Therefore, the clock signal is not received by the processor until time 18 since the processor is busy servicing the interrupt. A time period 16 between time 12 and time 18 is called "latency time." A difference between the latency time among several ticks is the jitter, which negatively impacts the quality of the real time system.

Another problem with the system of FIG. 1 is that a long latency time reduces the amount of processing time allocated to the real-time operating system, meaning fewer operations can be performed during this time. This is especially critical if the real-time program must end at a fixed time 19. In the case of a control system for a drive, fewer drives can be operated in time period 14 with a long latency time.

Prior methods of reducing jitter have been unsatisfactory. One method is to limit the openness of the system, such that certain routines and interrupts may not be used during the PC operating system time period 10. However, this limits the configurability and adaptability of the system. Another method is to verify the capability of the overall system based on each different application and, more specifically, based on the interrupt delays of each different application. However, this method is costly and requires a great deal more programming time and expertise. Another method is to use a non-maskable interrupt instead of a maskable interrupt. One drawback of this method is that some software routines (e.g., hardware programming routines) may need to disable interrupts (e.g., to access hardware registers within a fixed time period) and such routines will fail if interrupted by a non-maskable interrupt.

Accordingly, there is a need for a system and method for reducing jitter in a signal. There is further a need for an improved real-time numeric control system for a drive having reduced jitter and improved quality. Further still, there is a need for an improved method of reducing jitter in a control system operating a PC operating system and a real-time operating system. There is also a need for a control system having both PC capability and real-time capability without requiring two separate and distinct microprocessors.

SUMMARY OF THE INVENTION

According to one exemplary embodiment, a control system having reduced jitter includes a processor and a timer. The processor is configured to operate a first program and a second program. The timer is configured to generate a first interrupt a predetermined time before a second interrupt and to provide the interrupts to the processor. The processor is further configured to switch operation from the first program to the second program in response to the first interrupt and to perform time sensitive tasks upon receipt of the second interrupt.

According to an alternative embodiment, a method of reducing jitter in a control system is disclosed. The control system operates a first program and a second program. The method includes operating the first program, generating a clock signal, generating an interrupt a predetermined time before generating the clock signal, and switching operation from the first program to the second program in response to the interrupt.

According to another alternative embodiment, a numeric control system for a drive includes an input/output circuit coupleable to the drive, a processor, and a timer. The processor is configured to operate a first operating system and a second operating system, wherein the second operating system is configured to provide drive data in real time to the input/output circuit. The timer is configured to generate a clock signal and an interrupt, wherein the interrupt is generated a predetermined time before generating the clock signal, and to provide the clock signal and the interrupt to the processor. The processor is further configured to provide the drive data in response to the clock signal and to switch operation from the first operating system to the second operating system in response to interrupt.

According to yet another exemplary embodiment, a system for reducing jitter in a control system is disclosed. The control system operates a first program and a second program. The system includes means for operating the first program; means for generating a clock signal; means for generating an interrupt a predetermined time before generating the clock signal; and means for switching operation from the first program to the second program in response to the interrupt.

BRIEF DESCRIPTION OF THE DRAWINGS

FIG. 1 is a timing diagram illustrating jitter in a prior art system;

FIG. 3 is a timing diagram illustrating the functionality of the control system according to an exemplary embodiment;

FIG. 4 is a circuit diagram of a portion of the timer board of FIG. 2;

DETAILED DESCRIPTION OF THE EXEMPLARY EMBODIMENTS

Figure 2:
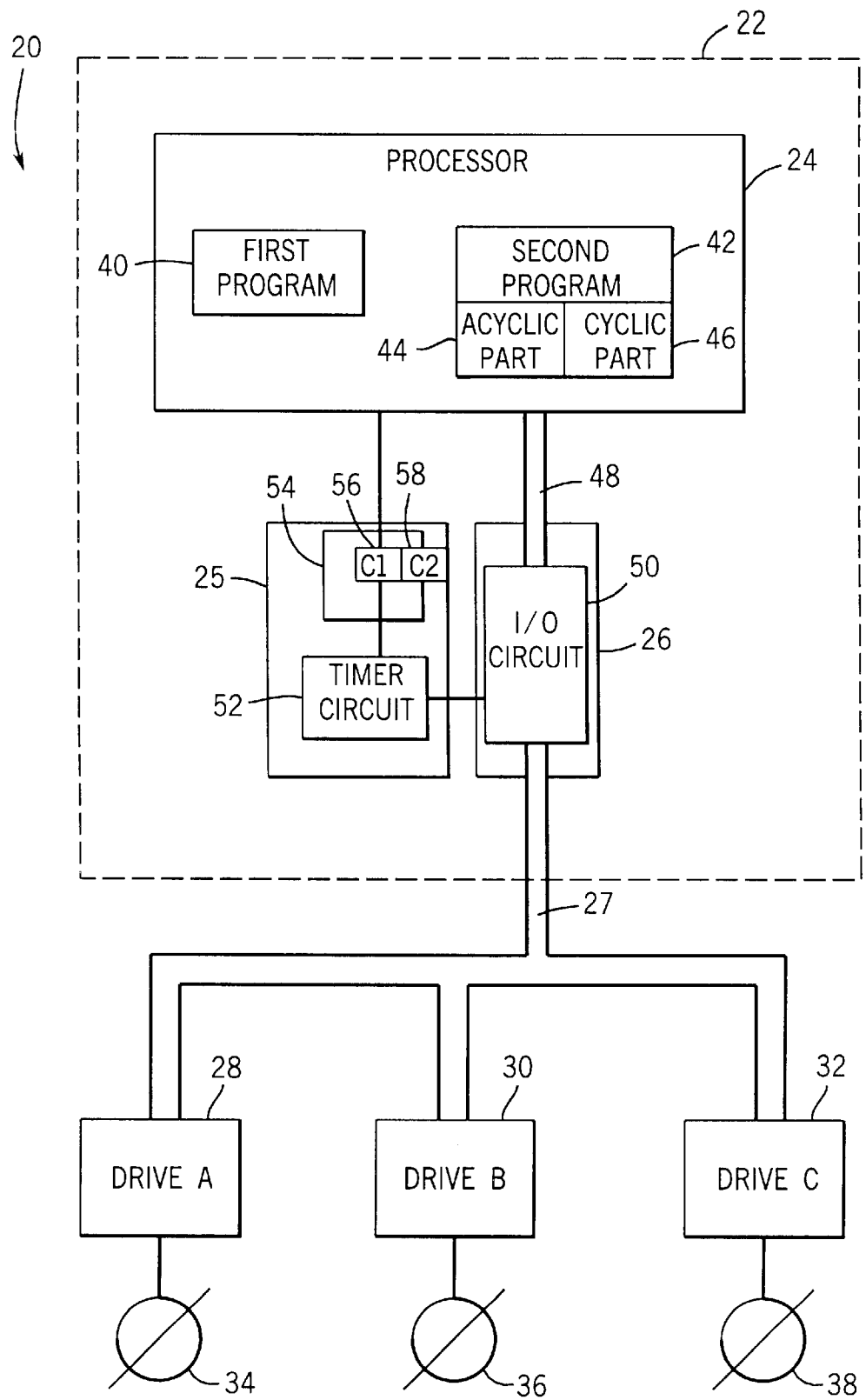
FIG. 2 is a block diagram of a numeric control system for a drive according to an exemplary embodiment.

Referring first to FIG. 2, a numeric control system 20 according to an exemplary embodiment is shown. Numeric control system 20 includes a computer 22 having a processor 24, a timer board 25, and an I/O interface board 26, an I/O interface or bus 27 (e.g., a Profibus, PC parallel port, or other output interface), a plurality of drives 28, 30, and 32 (e.g., electric or hydraulic drives, relays, switches, analog-to-digital converters, other I/O devices, etc.), and a plurality of driven elements 34, 36, an 38 (e.g., motors). Processor 24 (e.g., an INTEL microprocessor, a microcontroller, discrete circuit components, etc.) operates a first program 40, such as a WINDOWS NT or DOS-based operating system, and a second program 42, such as a real-time operating system. Second program 42 includes an acyclic part 44 and a cyclic part 46, as will be described below.

Processor 24 is coupled to I/O interface board 26 via a bus 48. Interface board 26 comprises analog and/or digital circuitry, such as a microcontroller, programmable logic devices, buffers, etc., and includes an I/O circuit 50 (e.g., a drive controller or other circuit elements) coupled between I/O interface 27 and bus 48 for communication therebetween. Timer board 25 includes a timer circuit 52 coupled to comparators 56 and 58. Timer circuit 52 includes circuitry (e.g., programmable logic, an oscillator, etc.) to generate clock ticks or interrupts. Comparators 56 and 58 provide interrupt and/or clock signals to processor 24 with a predetermined delay from the time the interrupt or clock signal is received from timer circuit 52. Alternatively, I/O circuit 50, timer circuit 52, and comparators 56 and 58 may be disposed on a single board or medium (e.g., a printed circuit board or substrate).

Referring now to FIG. 4, a more detailed view of timer circuit 52 and processor 24 is shown according to an exemplary embodiment. In this example, timer circuit 52 comprises programmable logic and operates according to a stored program to provide interrupts directly and via comparators 56 and 58 to processor 24. Timer circuit 52 receives an oscillating signal from I/O circuit 50. Alternatively, timer circuit 52 may be clocked by an oscillator, a clock signal received from processor 24, or an oscillating signal from another source. Timer circuit 52 generates messages according to the stored program and provides the messages to processor 24 directly via line 54 and via the output of each comparator 56, 58. The messages include an interrupt identifier and the interrupt.

Processor 24, upon receipt of the interrupt, handles the interrupt in a conventional manner.

Figure 5:
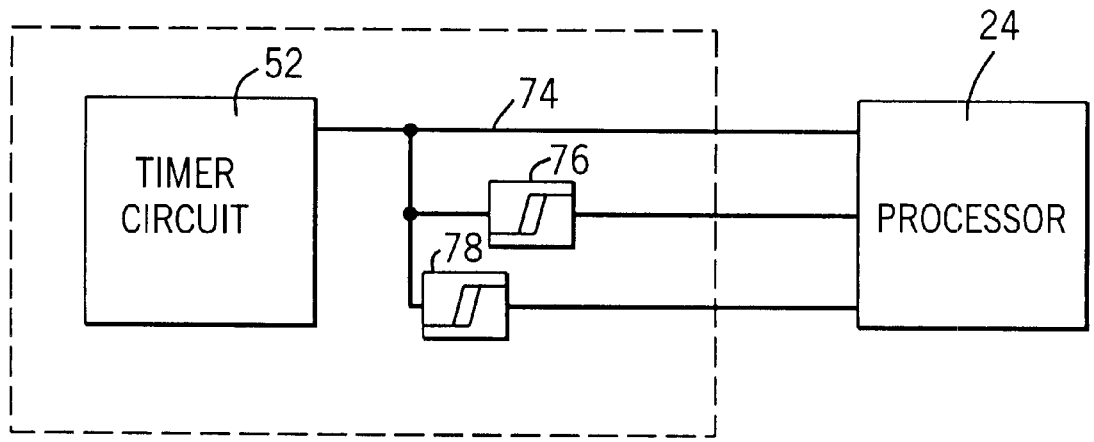
FIG. 5 is a circuit diagram of the portion of the timer board of FIG. 4 according to an alternative embodiment.
Figure 6:
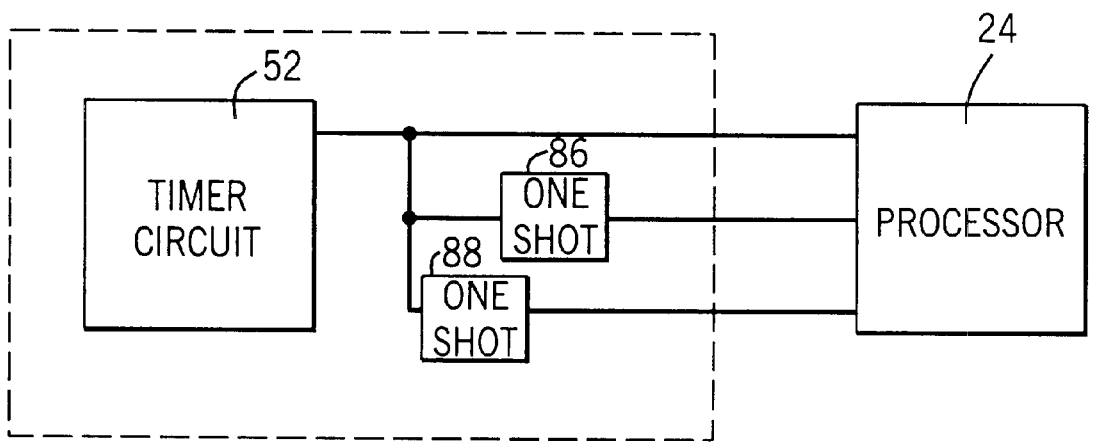
FIG. 6 is a circuit diagram of the portion of the timer board of FIG. 4 according to yet another alternative embodiment.

Alternatives to the configuration of FIG. 4 for providing clock signals and interrupts are contemplated herein. For example, FIG. 5 discloses an alternative system using Schmitt triggers 76, 78 in place of comparators 56, 58. FIG. 6 discloses another alternative system using two cascaded one-shot timers 86, 88 in place of comparators 56, 58.

Yet another alternative is to use only one comparator or timing element along with software programmed into processor 24 or timer circuit 52 to generate the interrupts at the desired times. One advantage of this embodiment is that processor 24 may function as the timer circuit, and a separate timer circuit (e.g., timer circuit 52) is not needed. In this embodiment, if an absolute timer is used (e.g., a PC real-time clock), only the required absolute times for each interrupt need be programmed into the software. If a relative timer is used, the software must read the actual time and program the time difference to the next interrupt.

The operation of these exemplary embodiments will now be described with reference to FIG. 2 and the timing diagram of FIG. 3. Computer 22 is implemented on a SINUMERIK 840Di Computer Numeric Control (CNC) System, manufactured by Siemens AG, Munich, Germany, but may alternatively be implemented on any system requiring real-time processing or on any other computer system. Thus, processor 24 is configured to generate real-time position data and provide the real-time position data to one or more of drives 28, 30, and 32. When triggered by I/O circuit 50, timer circuit 52 generates a real-time clock signal (e.g., an interrupt) having a clock tick 68, in this exemplary embodiment approximately every 1 to 8 milliseconds (though other frequencies are contemplated), and provides it via line 54 to processor 24. Clock tick 68 may be generated by any type of buffer, circuit element, etc., configured to provide the real-time clock signal to processor 24.

Timer circuit 52 generates clock tick 68 at a precise, fixed time at which processor 24 is to provide the real-time position data to drives 28, 30, and 32. Therefore, the jitter of clock tick 68 must be minimized. Referring to FIG. 3, while program 40 is running, various interrupts (e.g., closed times, exceptions, faults, aborts, direct memory accesses (DMAs), etc.) are processed which can delay the receipt of clock tick 68, thereby causing jitter and delaying the point at which processor 24 begins operating second program 42 until the preceding interrupt has been handled. These preceding interrupts can delay processor 24 for a defined or needed time period. In a typical PC-based system, thousands of program components in program 40 cause delays on the order of 60 $\mu$s, tens of program components cause delays on the order of 200 $\mu$s, and several program components cause delays on the order of 200 $\mu$s to 16 ms. Identifying and accommodating for each of these program components on an individual basis is time-consuming and impractical.

According to an advantageous aspect of the exemplary embodiment, timer circuit 52 is configured to generate an interrupt or pretrigger 64 a predetermined time 67 (e.g., 200 $\mu$s, though other times are contemplated) before generating the real-time clock tick 68. Interrupt 64 is provided via line 54 in this exemplary embodiment. When processor 24 receives interrupt 64 via line 54, processor 24 is configured to switch operation from first program 40 to acyclic part 44 of second program 42, immediately after handling any remaining interrupt already being processed by processor 24 in accordance with first program 40. Any delay caused by this remaining interrupt occurs during time period 66. After predetermined time 67 has expired, at time 68, timer circuit 52 generates clock tick 68 via comparator 56, at which time processor 24 operates cyclic part 46 of second program 42. Cyclic part 46 processes time sensitive data or tasks, such as, processing of data for I/O interface 27 (e.g., receiving data from drives 28, 30, and 32 and transmitting data to drives 28, 30, 32, such as, position data, etc.). Cyclic part 46 operates tasks which occur every cycle of the clock signal (i.e., every time clock tick 68 is received). In this embodiment, cyclic part 46 includes a code segment configured to provide data read and/or writes to each of plurality of drives 28, 30, and 32 in sequential order. Acyclic part 44 processes non-time sensitive data or tasks, such as, generating new position data based on an interpolated part program. Acyclic part 44 operates tasks which do not necessarily occur every cycle of the clock signal.

As can be seen from FIG. 3, the remaining interrupt from first program 40 is handled during the non-time critical acyclic part 44 of second program 42. Thus, jitter in clock tick 68 is reduced or eliminated, depending on the duration of time period 66. Although second program 42 allows for some interrupts, second program 42 is optimized for real-time system applications, wherein the maximum interrupt latencies allowed are on the order of 20–25 $\mu$s, or at least substantially less than the maximum interrupt latencies allowed in first program 40.

Predetermined time 67 is set to 200 $\mu$s in this exemplary embodiment, thereby significantly reducing the likelihood of jitter caused by interrupts in first program 40. Some of the interrupts may still cause a jitter which extends beyond predetermined time 67 (e.g., program components which delay processor 24 for more than 200 $\mu$s and which begin just before interrupt 64 is received), in which case predetermined time 67 may be increased. Alternatively, those interrupts can be identified and modified one-by-one to cause a shorter delay. Predetermined time delay 67 may be greater or less than 200 $\mu$s, depending on the application. The shorter the delay, the more likely that interrupts will cause jitter; the longer the delay, the longer second program 42 takes, and the more processing time that may be wasted.

In the exemplary embodiment of FIG. 3, processor 24 is configured to operate non-time sensitive tasks during predetermined time delay 67, such as, acyclic tasks. Alternatively, processor 24 may be configured to perform no tasks during predetermined time delay 67. In applications where there are no non-time sensitive tasks to perform, irrelevant tasks can be performed during predetermined time 67 to cause the delay. Although this wastes computation time, control quality is improved since jitter is reduced. Preferably, however, non-time sensitive tasks are grouped in acyclic part 44 of program 42 and are performed during predetermined time delay 67.

As another alternative, another pretrigger interrupt is generated before switching processing from second program 42 to a third program (i.e., using a second predetermined time delay), such that the point in time at which a third program begins is less affected by any interrupts during second program 42 (i.e., less jitter).

At the end of second program 42, processor 24 can return to first program 40 at the end of cyclic part 46 or by using another interrupt via comparator 58 at time 70. In the latter case, additional code (e.g., another portion of acyclic part 44) may be run after cyclic part 46 until the interrupt from comparator 58 is received. Thus, the interrupt provided by comparator 58 allows second program 42 to have a defined computation time (i.e., to be deterministic).

According to another exemplary embodiment, interrupt 68 can be eliminated. In this embodiment, a software timer operable in processor 24 or timer circuit 52 counts in a loop, for example from 2,000 $\mu$s to 0 $\mu$s. At 0 $\mu$s, the timer generates interrupt 64. Then the timer counts from 2,000 $\mu$s to 1,800 $\mu$s (e.g., in a system wherein the predetermined time is 200 $\mu$s). At 1,800 $\mu$s, cyclic part 46 is begun without the need for a separate interrupt, such as interrupt 68.

According to yet another alternative embodiment, a hardware real-time clock signal generated by I/O circuit 50 is used to trigger timer circuit 52 to provide interrupts at times 64, 68, and 70 (FIG. 3). This hardware clock signal is utilized in the Sinumerik 840Di for clocking drives 28, 30, and 32, but may also be used to clock second program 42 (e.g., a real-time operating system). However, since the hardware clock signal occurs during first program 40 (e.g. a PC operating system), an additional time offset is required before timer circuit 52 sends the pretrigger interrupt (at time 64) to processor 24. Thus, this embodiment requires that line 54 is replaced with a third comparator 54a between timer circuit 52 and processor 24. During operation, the hardware clock signal is provided from I/O circuit 50 to timer circuit 52 periodically (e.g., every 2 milliseconds) at time 0 microseconds, which falls somewhere within first program 40. After a first delay (e.g., at time 800 microseconds), comparator 56 generates a pretrigger interrupt (at time 64 in FIG. 3). After a second delay, (e.g., at time 1000 microseconds), comparator 54a generates a cyclic part interrupt (at time 68 in FIG. 3). After a third delay (e.g., at time 1800 microseconds), comparator 58 generates an end real-time program interrupt (at time 70 in FIG. 3).

While the exemplary embodiments have been illustrated and described, it should be understood that the embodiments disclosed herein are offered by way of example only. For example, the invention is not limited to a numeric control system, but may have applications in many other systems which integrate PC-based operating systems with real-time operating systems, or non-integrated systems. While programs 40 and 42 are discussed herein as operating systems, other types of programs may be substituted therefor, such as software applications, code segments, etc. The invention is not limited to a particular embodiment, but extends to various modifications that nevertheless fall within the scope of the appended claims.

What is claimed is:

1. A control system having reduced jitter, comprising:
   a processor configured to operate a first program and a second program; and
   a timer configured to generate a first interrupt a predetermined time before a second interrupt and to provide the interrupts to the processor, wherein the processor is configured to switch operation from the first program to the second program in response to the first interrupt and to perform time sensitive tasks upon receipt of the second interrupt.

2. The control system of claim 1, wherein the processor is configured to switch operation from the first program to the second program upon receipt of the first interrupt and after a preceding interrupt is handled.

3. The control system of claim 1, wherein the second program is a real-time operating system.

4. The control system of claim 3, wherein the first program includes a first maximum interrupt latency and the second program includes a second maximum interrupt latency, and wherein the second maximum interrupt latency is substantially less than the first maximum interrupt latency.

5. The control system of claim 1, wherein the first program is a WINDOWS-based operating system.

6. The control system of claim 1, wherein the second interrupt is a real-time clock signal.

7. The control system of claim 1, wherein the processor is configured to perform non-time sensitive tasks between the time at which operation is switched from the first program to the second program and receipt of the second interrupt.

8. The control system of claim 1, wherein the processor is configured to perform no tasks between the time at which operation is switched from the first program to the second program and receipt of the second interrupt.

9. The control system of claim 1, wherein the timer is further configured to generate a third interrupt, the processor configured to switch operation from the second program to the first program in response to the third interrupt.

10. The control system of claim 9, wherein the processor is configured to maintain a defined computation time for the second program by adjusting the time at which the third interrupt is generated.

11. A method of reducing jitter in a control system operating a first program and a second program, comprising:

operating the first program;

generating a clock signal;

generating an interrupt a predetermined time before generating the clock signal; and switching operation from the first program to the second program in response to the interrupt.

12. The method of claim 11, further comprising performing time sensitive tasks upon receipt of the clock signal.

13. The method of claim 11, wherein the first program includes first interrupts and the second program includes second interrupts, wherein a latency of at least one of the first interrupts is longer than latencies of all of the second interrupts.

14. The method of claim 11, wherein the first program is a DOS-based operating system and the second program is a real-time operating system.

15. The method of claim 11, further comprising performing non-time sensitive tasks between the steps of generating the interrupt and generating the clock signal.

16. The method of claim 11, further comprising performing no tasks between the steps of generating the interrupt and generating the clock signal.

17. The method of claim 11, further comprising:

generating a second interrupt; and switching operation from the second program to the first program in response to the second interrupt.

18. A numeric control system for a drive, comprising:

an input/output circuit coupleable to the drive;

a processor configured to operate a first operating system and a second operating system, wherein the second operating system is configured to provide drive data in real time to the input/output circuit; and a timer configured to generate a clock signal and an interrupt, wherein the interrupt is generated a predetermined time before generating the clock signal, and to provide the clock signal and the interrupt to the processor, wherein the processor is configured to provide the drive data in response to the clock signal and to switch operation from the first operating system to the second operating system in response to the interrupt.

19. The numeric control system of claim 18, wherein the first operating system is a DOS-based operating system.

20. The numeric control system of claim 19, wherein the second operating system is a real-time operating system.

21. A system for reducing jitter in a control system operating a first program and a second program, comprising:

means for operating the first program;

means for generating a clock signal;

means for generating an interrupt a predetermined time before generating the clock signal; and means for switching operation from the first program to the second program in response to the interrupt.

22. The system of claim 21, further comprising means for performing time sensitive tasks upon receipt of the clock signal.

23. The system of claim 21, further comprising means for performing non-time sensitive tasks between the steps of generating the interrupt and generating the clock signal.

24. The system of claim 21, further comprising means for performing no tasks between the steps of generating the interrupt and generating the clock signal.

25. The system of claim 21, further comprising:

means for generating a second interrupt; and means for switching operation from the second program to the first program in response to the second interrupt.

26. The system of claim 25, further comprising means for maintaining a defined computation time for the second program.

* * * * *